United States Patent
Neff et al.

(10) Patent No.: US 9,018,272 B2
(45) Date of Patent: *Apr. 28, 2015

(54) FLEXIBLE POLYURETHANE FOAM AND METHOD OF PRODUCING SAME

(71) Applicant: BASF SE, Ludwigshafen (DE)

(72) Inventors: Raymond A. Neff, Northville, MI (US); Theodore M. Smiecinski, Woodhaven, MI (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/059,781

(22) Filed: Oct. 22, 2013

(65) Prior Publication Data

US 2014/0121290 A1    May 1, 2014

Related U.S. Application Data

(63) Continuation of application No. 12/711,849, filed on Feb. 24, 2010, now Pat. No. 8,604,094.

(51) Int. Cl.
| | |
|---|---|
| *C08G 18/28* | (2006.01) |
| *C08G 18/40* | (2006.01) |
| *C08G 18/48* | (2006.01) |
| *C08G 18/63* | (2006.01) |
| *C08G 18/76* | (2006.01) |
| *C08J 9/12* | (2006.01) |
| *C08G 101/00* | (2006.01) |

(52) U.S. Cl.
CPC ............. *C08J 9/127* (2013.01); *C08G 18/4072* (2013.01); *C08G 18/4845* (2013.01); *C08G 18/632* (2013.01); *C08G 18/7664* (2013.01); *C08G 18/7671* (2013.01); *C08G 2101/0008* (2013.01); *C08G 2101/005* (2013.01); *C08G 2101/0058* (2013.01); *C08J 2205/06* (2013.01)

(58) Field of Classification Search
CPC ............. C08G 18/4845; C08G 18/632; C08G 2101/0008; C08J 9/127; C08J 2203/06; C08J 2203/10; C08J 2205/06
USPC .................................. 521/134, 137, 170, 174
See application file for complete search history.

(56) References Cited

U.S. PATENT DOCUMENTS

| | | | |
|---|---|---|---|
| 4,205,136 A | 5/1980 | Ohashi et al. | |
| 4,722,942 A | 2/1988 | Nichols et al. | |
| 5,521,226 A | 5/1996 | Bleys | |
| 5,538,779 A | 7/1996 | Mispreuve et al. | |
| 5,594,097 A | 1/1997 | Chaffanjon et al. | |
| 5,618,854 A | 4/1997 | Skorpenske et al. | |
| 5,698,609 A | 12/1997 | Lockwood et al. | |
| 5,877,227 A | 3/1999 | Murty | |
| 6,063,825 A | 5/2000 | Isobe et al. | |
| 6,158,815 A | 12/2000 | Sugie et al. | |
| 6,352,658 B1 | 3/2002 | Chang et al. | |
| 6,432,543 B2 | 8/2002 | Harrison et al. | |
| 6,457,777 B1 | 10/2002 | Kazuno et al. | |
| 6,583,192 B2 | 6/2003 | Falke et al. | |
| 6,649,107 B2 | 11/2003 | Harrison et al. | |
| 6,660,783 B2 | 12/2003 | Arit et al. | |
| 6,747,068 B2 | 6/2004 | Kelly | |
| 6,759,448 B2 | 7/2004 | Toyota et al. | |
| 6,765,034 B2 | 7/2004 | Nishida et al. | |
| 6,797,736 B1 | 9/2004 | Smiecinski et al. | |
| 6,852,403 B2 | 2/2005 | Harrison et al. | |
| 6,858,655 B1 | 2/2005 | Hofmann et al. | |
| 7,238,730 B2 | 7/2007 | Apichatachutapan et al. | |
| 7,456,229 B2 | 11/2008 | Hager et al. | |
| 8,604,094 B2 * | 12/2013 | Neff et al. ...................... | 521/174 |
| 2003/0158280 A1 * | 8/2003 | Daunch et al. ................ | 521/155 |
| 2004/0254256 A1 | 12/2004 | Lockwood et al. | |
| 2005/0101681 A1 | 5/2005 | Kaushiva et al. | |
| 2007/0293594 A1 | 12/2007 | Heisler et al. | |
| 2010/0036008 A1 | 2/2010 | Bruchmann et al. | |
| 2010/0160470 A1 | 6/2010 | Smiecinski et al. | |

FOREIGN PATENT DOCUMENTS

| | | |
|---|---|---|
| EP | 0547765 A1 | 6/1993 |
| EP | 0547765 B1 | 6/1993 |
| EP | 1164153 A1 | 12/2001 |
| EP | 1174453 A1 | 1/2002 |

(Continued)

OTHER PUBLICATIONS

Publication: State of California, Technical Bulletin No. 117, "Requirements, Test Procedure and Apparatus for Testing the Flame Retardance of Resilient Filling Materials Used in Upholstered Furniture", Mar. 2000, 8 pages.

Publication: Smiecinski et al., BASF Corporation, Wyandotte, Michigan, "Visco-Elastic Polyurethane Foam: The Impact of Isocyanate Upon Foam Morphology", pp. 405-416.

International Search Report for Application No. PCT/US2011/025862 dated Feb. 23, 2011, 3 pages.

English language abstract and machine-assisted English translation for JP 06-128350 extracted from the PAJ database on Dec. 10, 2014, 16 pages.

(Continued)

*Primary Examiner* — John Cooney

(74) *Attorney, Agent, or Firm* — Howard & Howard Attorneys PLLC

(57) ABSTRACT

A flexible polyurethane foam comprises the reaction product of an isocyanate component and an isocyanate-reactive component in the presence of a blowing agent. The isocyanate component comprises a polymeric diphenylmethane diisocyanate component and a monomeric diphenylmethane diisocyanate component. The monomeric diphenylmethane diisocyanate component comprises 2,4'-diphenylmethane diisocyanate and 4,4'-diphenylmethane diisocyanate. The flexible polyurethane foam is substantially free of supplemental flame retardant additives and exhibits flame retardance under flammability tests according to California Technical Bulletin 117 regulations.

23 Claims, No Drawings

(56) References Cited

FOREIGN PATENT DOCUMENTS

| | | | |
|---|---|---|---|
| EP | 1178061 A1 | 6/2002 |
| EP | 1234843 A1 | 8/2002 |
| EP | 1305352 B1 | 8/2005 |
| JP | 06-128350 A | 5/1994 |
| JP | 11-166033 A | 6/1999 |
| JP | 2007-508398 A | 4/2007 |
| WO | WO 0008083 A1 | 2/2000 |
| WO | WO 0055232 A1 | 9/2000 |
| WO | WO 0073362 A2 | 12/2000 |
| WO | WO 0073362 A3 | 12/2000 |
| WO | WO 0073363 A1 | 12/2000 |
| WO | WO 0107521 A1 | 2/2001 |
| WO | WO 0132735 A1 | 5/2001 |
| WO | WO 0132736 A1 | 5/2001 |
| WO | WO 0160884 A1 | 8/2001 |
| WO | WO 2011106377 A4 | 11/2001 |
| WO | WO 0210245 A1 | 2/2002 |
| WO | WO 0210246 A1 | 2/2002 |
| WO | WO 02059175 A2 | 8/2002 |
| WO | WO02059175 A3 | 8/2002 |
| WO | WO 2004014976 A1 | 2/2004 |
| WO | WO 2004014980 A1 | 2/2004 |
| WO | WO 2005003205 A1 | 1/2005 |
| WO | WO 2008071622 A1 | 6/2008 |
| WO | WO 2009003964 A1 | 1/2009 |
| WO | WO 2011106377 A1 | 9/2011 |

OTHER PUBLICATIONS

English language abstract and machine-assisted English translation for JP 11-166033 extracted from the PAJ database on Dec. 10, 2014, 21 pages.
English language abstract for JP 2007-508398 extracted from espacenet.com database on Dec. 10, 2014, 1 page.
English language abstract for WO 2008/071622 extracted from espacenet.com database on Dec. 10, 2014, 2 pages.

* cited by examiner

FLEXIBLE POLYURETHANE FOAM AND METHOD OF PRODUCING SAME

CROSS REFERENCE TO RELATED APPLICATION

This application is a continuation of U.S. application Ser. No. 12/711,849, filed on Feb. 24, 2010, which is a continuation-in-part of application Ser. No. 12/342,397, filed on Dec. 23, 2008.

BACKGROUND OF THE INVENTION

1. Field of the Invention

The subject invention generally relates to a flexible polyurethane foam and a method of producing the flexible polyurethane foam. More specifically, the subject invention relates to flexible polyurethane foam that exhibits flame retardance.

2. Description of the Related Art

Polyurethane foams exhibit a wide range of stiffness, hardness, and density. One type of polyurethane foam, flexible polyurethane foam, is especially useful for providing cushioning, support, and comfort for furniture articles. For example, flexible polyurethane foam is often incorporated into furniture comfort articles, such as cushions, padding, mattresses, topper pads, and pillows, as well as furniture support articles, such as sofas, love seats, and chairs.

Flexible polyurethane foams are typically flammable, especially when subjected to repeated compression and bending, but can be formulated to resist small open flame ignition sources. The repeated compression and bending often results in compromise of the cellular structure of flexible polyurethane foams, generally referred to as flex fatigue. Since flexible polyurethane foams are repeatedly subjected to compression and bending and thus, over time, experience flex fatigue when used in furniture comfort and support articles, United States federal and state regulations currently proscribe flammability limits for flexible polyurethane foams. One such state regulation, California Technical Bulletin 117, specifies requirements, test procedures, and equipment for testing flame retardance of resilient filling materials, e.g. flexible polyurethane foams, in upholstered furniture.

Various approaches for producing flexible polyurethane foams exhibiting flame retardance and flexibility are known in the art. For example, many existing flexible polyurethane foams exhibiting flame retardance are produced via a reaction between toluene diisocyanate (TDI) and an isocyanate-reactive component that includes one or more polyols. TDI is generally utilized over other isocyanates because TDI is known to impart polyurethane foams with desirable physical and flex fatigue properties at low densities.

More common approaches for producing flexible polyurethane foams exhibiting flame retardance rely on inclusion of supplemental flame retardant additives in the isocyanate-reactive component. For example, flame retardant additives including minerals, such as aluminum trihydrate; salts, such as hydroxymethyl phosphonium salts; phosphorous compounds; phosphated esters; and halocarbons or other halogenated compounds, such as those containing bromine and/or chlorine; may be included in the isocyanate-reactive component.

SUMMARY OF THE INVENTION AND ADVANTAGES

The subject invention provides a flexible polyurethane foam comprising the reaction product of an isocyanate component and an isocyanate-reactive component in the presence of a blowing agent. The isocyanate component is substantially free of toluene diisocyanate and comprises polymeric diphenylmethane diisocyanate and a monomeric diphenylmethane diisocyanate component. The monomeric diphenylmethane diisocyanate component comprises 2,4'-diphenylmethane diisocyanate and 4,4'-diphenylmethane diisocyanate. The flexible polyurethane foam is substantially free of supplemental flame retardant additives and exhibits flame retardance under flammability tests according to California Technical Bulletin 117 regulations. The subject invention also provides a method of producing the flexible polyurethane foam. The method comprises the steps of providing the isocyanate component, providing the isocyanate-reactive component, and reacting the isocyanate component with the isocyanate-reactive component in the presence of the blowing agent to produce the flexible polyurethane foam.

The flexible polyurethane foam of the subject invention exhibits flame retardance under flammability tests according to California Technical Bulletin 117 without requiring supplemental flame retardant additives, which decreases costs and processing steps associated with the production of such flexible polyurethane foams. Additionally, the flexible polyurethane foam of the present invention exhibits excellent comfort and support properties, and eliminates the need to use toluene diisocyanate (TDI) to achieve flame retardance.

DETAILED DESCRIPTION OF THE INVENTION

The present invention includes a flexible polyurethane foam and a method of producing the flexible polyurethane foam. The flexible polyurethane foam is particularly suitable for providing cushioning, support, and comfort in furniture articles, such as cushions, padding, and mattresses. However, it is to be appreciated that the flexible polyurethane foam of the present invention can have applications beyond furniture articles, such as noise, vibration, and harshness (NVH) reduction articles for vehicles.

As used herein, the terminology "flexible polyurethane foam" denotes a class of flexible polyurethane foam and stands in contrast to rigid flexible polyurethane foam. Flexible polyurethane foam is generally porous, having open cells and pneumatic properties, whereas rigid flexible polyurethane foam is generally non-porous, having closed cells and no rubber-like characteristics. In particular, flexible polyurethane foam is a flexible cellular product which will not rupture when a specimen 200 mm by 25 mm by 25 mm is bent around a 25-mm diameter mandrel at a uniform rate of 1 lap in 5 seconds at a temperature between 18 and 29° C., as defined by ASTM D3574-03. Further, polyol selection impacts the stiffness of flexible polyurethane foams. That is, flexible polyurethane foams are typically produced from polyols having weight average molecular weights from about 1,000 to about 10,000 g/mol and hydroxyl numbers from about 10 to about 200 mg KOH/g. In contrast, rigid flexible polyurethane foams are typically produced from polyols having weight average molecular weights from about 250 to about 700 g/mol and hydroxyl numbers from about 300 to about 700 mg KOH/g. Moreover, flexible polyurethane foams generally include more urethane linkages as compared to rigid flexible polyurethane foams, whereas rigid flexible polyurethane foams may include more isocyanurate linkages as compared to flexible polyurethane foams. Further, flexible polyurethane foams are typically produced from polyols having low-functionality (f) initiators, i.e., f<4, such as dipropylene glycol (f=2) or glycerine (f=3). By comparison, rigid flexible polyurethane foams are typically produced from polyols having high-functionality initiators, i.e., f>4, such as Mannich bases (f=4), toluenediamine (f=4), sorbitol (f=6), or sucrose (f=8). Additionally, as known in the art, flexible polyurethane foams are typically produced from glycerine-based polyether polyols, whereas rigid flexible polyurethane foams are typically produced from polyfunctional polyols that create a three-dimensional cross-linked cellular structure, thereby increasing the stiffness of the rigid flexible polyurethane foam. Finally, although both flexible polyurethane foams and rigid flexible polyurethane foams include cellular structures, flexible polyurethane foams typically include more open cell walls, which allow air to pass through the flexible polyurethane foam when force is applied as compared to rigid flexible polyurethane foams. As such, flexible polyurethane foams typically recover shape after compression. In contrast, rigid flexible polyurethane foams typically include more closed cell walls, which restrict air flow through the rigid flexible polyurethane foam when force is applied. Therefore, flexible polyurethane foams are typically useful for cushioning and support applications, e.g. furniture comfort and support articles, whereas rigid flexible polyurethane foams are typically useful for applications requiring thermal insulation, e.g. appliances and building panels.

The flexible polyurethane foam of the present invention comprises the reaction product of an isocyanate component and an isocyanate-reactive component. It is to be appreciated that the terminology "isocyanate component" as used herein, is not limited to monomeric isocyanate, i.e., the isocyanate component may comprise monomeric isocyanates and polymeric isocyanates. In addition, the terminology "isocyanate component" as used herein, encompasses prepolymers. Said differently, prepolymers, e.g. polyols reacted with excess isocyanate, may be utilized as the isocyanate component in the present invention.

The isocyanate component comprises polymeric diphenylmethane diisocyanate (pMDI). PMDI is typically present in the isocyanate component to provide reactive groups, i.e., NCO groups, during a flexible polyurethane foaming reaction, as set forth in more detail below. PMDI is typically a mixture of oligomeric diphenylmethane diisocyanates, i.e., a mixture of MDI and its dimer and/or trimer. PMDI comprises a crude MDI having three or more benzene rings including NCO groups. PMDI is typically obtained through the condensation of aniline and formaldehyde in the presence of an acid catalyst, followed by phosgenation and distillation of a resulting polymeric amine mixture. PMDI is typically present in the isocyanate component in an amount of from about 1 to about 30, more typically from about 5 to about 25, even more typically from about 8 to about 12 parts by weight based on 100 parts by weight of the isocyanate component.

The isocyanate component further comprises a monomeric diphenylmethane diisocyanate (MDI) component. As understood in the art, the terminology "monomeric MDI" denotes a component encompassing the MDI isomers, such as 2,4'-MDI, 4,4'-MDI, and/or 2,2'-MDI. The monomeric MDI component of the present invention comprises 2,4'-MDI and 4,4'-MDI. As compared to 4,4'-MDI, 2,4'-MDI is an asymmetrical molecule and provides two NCO groups of differing reactivities. Without intending to be limited by theory, it is believed that 2,4'-MDI influences the flexible polyurethane foaming reaction parameters such as stability and curing time of the flexible polyurethane foam.

The monomeric MDI component is typically present in the isocyanate component in an amount of from about 70 to about 99, more typically from about 75 to about 95, even more typically from about 88 to about 92 parts by weight based on 100 parts by weight of the isocyanate component. As set forth above, the monomeric MDI component comprises 2,4'-MDI and 4,4'-MDI. In terms of the overall isocyanate component, the 2,4'-MDI is typically present in the isocyanate component in an amount of from about 10 to about 50, more typically from about 30 to about 48, even more typically from about 39 to about 45 parts by weight based on 100 parts by weight of the isocyanate component. Generally, the remainder of the isocyanate component (i.e., the isocyanate component other than pMDI and 2,4'-MDI) comprises 4,4'-MDI.

Notably, the isocyanate component is substantially free of supplemental flame retardant additives. "Substantially free" as used herein in relation to the isocyanate component being substantially free of supplemental flame retardant additives means that the isocyanate component typically comprises supplemental flame retardant additives in an amount less than about 1.0, more typically less than about 0.5, even more typically 0 parts by weight based on 100 parts by weight of the isocyanate component. Supplemental flame retardant additives are flame retardant additives which are separately, i.e., discretely, added to the isocyanate component or isocyanate-reactive component to impart conventional polyurethane foams produced therefrom with flame retardant properties. Examples of supplemental flame retardant additives include, but are not limited to, minerals, such as aluminum trihydrate; salts, such as hydroxymethyl phosphonium salts; phosphorus-containing compounds; halogenated flame retardant additives, such as halocarbons; and melamine, which is also utilized as a flame retardant additive in particular applications. Because flame retardant additives are typically expensive and may introduce additional processing steps into the method of producing flexible polyurethane foams, the flexible polyurethane foam of the present invention comprising the reaction product of the isocyanate component and the isocyanate-reactive component is cost effective to manufacture relative to conventional flame retardant polyurethane foams.

The isocyanate component of the present invention is substantially free of toluene diisocyanate (TDI), specifically 2,4'-TDI and 2,6'-TDI. Because TDI is typically less desirable for humans and the environment than MDI, the isocyanate component of the present invention exhibits more acceptable processing characteristics as compared to conventional isocyanate components comprising TDI. "Substantially free" as used herein in relation to the isocyanate component being substantially free of TDI means that the isocyanate component typically comprises TDI in an amount less than about 25, more typically less than about 10, even more typically 0 parts by weight based on 100 parts by weight of the isocyanate component. Yet, the flexible polyurethane foam of the present invention exhibits flame retardance under flammability tests according to California Technical Bulletin 117 regulations, as set forth in further detail below.

Without intending to be limited by theory, it is believed that the isocyanate component, which comprises pMDI and the monomeric MDI component, contributes to the excellent flame retardance of the flexible polyurethane foam produced therefrom because the monomeric MDI component and the pMDI change the melt characteristics of the flexible polyurethane foam. For example, it is believed that the monomeric MDI component and the pMDI provide additional char formation during burning for the flexible polyurethane foam. Additional char formation typically forms a stable, carbonaceous barrier which prevents a flame from accessing the underlying flexible polyurethane foam. More specifically, it is believed that the isocyanate component affects the crystallinity of the flexible polyurethane foam so that, when exposed to a flame, the flexible polyurethane foam melts away from flame rather than remaining in the flame. Stated differently, the isocyanate component provides the flexible polyurethane foams of the present invention with a continuous crystalline matrix that provides a charred barrier to flame propagation. Additionally, it is believed that the isocyanate component minimizes vapor formation when the flexible polyurethane foam of the present invention is exposed to heat. Since flame propagation requires a vapor phase, the flexible polyurethane foam of the present invention exhibits excellent flame retardance under flammability tests according to California Technical Bulletin 117.

The isocyanate component typically has NCO groups present in the isocyanate component in an amount of about 33 parts by weight based on 100 parts by weight of the isocyanate component. Further, the isocyanate component typically has a viscosity of about 17 cps at 25° C. and an average functionality of about 2.1. The isocyanate component typically has a flash point of about 200° C. and a density of about 1.20 g/cm$^3$ at 25° C., which allows for processing efficiencies such as ease of component mixing, thereby contributing to the cost effectiveness of producing the flexible polyurethane foam. A suitable isocyanate component for purposes of the present invention is Lupranate® 280, commercially available from BASF Corporation of Florham Park, N.J.

In certain embodiments, the isocyanate component consists essentially of the pMDI and the monomeric MDI component. In these embodiments, the pMDI is typically present in the isocyanate component in an amount of from about 5 to about 25 parts by weight based on 100 parts by weight of the isocyanate component and the monomeric MDI component is typically present in the isocyanate component in an amount of from about 75 to about 95 parts by weight based on 100 parts by weight of the isocyanate component. In these embodiments, the isocyanate component is typically free from isocyanates other than pMDI and the monomeric MDI component, which comprises 2,4'-MDI and 4,4'-MDI, as described above.

The isocyanate-reactive component of the present invention comprises a polyether polyol having a molecular weight of from about 700 to about 20,000 and a plurality of terminal caps which are substantially free of ethylene oxide groups. The polyether polyol typically has a molecular weight of from about 1,000 to about 5,000, and more typically from about 2,000 to about 4,000. The molecular weight of the polyether polyol is weight-average molecular weight. In certain embodiments, the polyether polyol is a polyether triol. As known in the art, polyether polyols are generally produced by reacting an alkylene oxide with an initiator in the presence of a catalyst, such as a basic catalyst or a double metal cyanide (DMC) catalyst. Even more typically, ethylene oxide (EO) is utilized such that the resulting polyether polyols are EO-capped. However, as set forth above, the polyether polyol of the isocyanate-reactive component has a plurality of terminal caps which are substantially free of EO groups. In certain embodiments, the terminal caps of the polyether polyol comprise propylene oxide (PO) groups. However, it is to be appreciated that the terminal caps of the polyether polyol may comprise other alkylene oxide groups, such as butylene oxide (BO) groups, or combinations of such alkylene oxide groups. Stated differently, the plurality of terminal caps of the polyether polyol typically comprise an alkylene oxide group selected from PO groups, BO groups, and combinations thereof. For example, in certain embodiments in which the polyether polyol of the isocyanate-reactive composition comprises a polyether triol, the polyether triol has the following general structure:

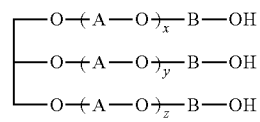

wherein each A is an independently selected bivalent hydrocarbon group having from 2 to 4 carbon atoms; each B is a bivalent hydrocarbon group having 3 carbon atoms; and x, y and z are each integers greater than 1. In this embodiment, the chains of the polyether triol comprise random and/or repeating units formed from EO, PO, and/or BO, and the terminal caps of the polyether triol comprise units comprise PO groups. The polyether polyol typically has a hydroxyl number of from about 20 to about 100, more typically from about 25 to about 75 mg KOH/g.

The polyether polyol is typically present in the isocyanate-reactive component in an amount of from about 20 to about 100, more typically from about 25 to about 75, even more typically from about 30 to about 65 parts by weight based on 100 parts by weight of total polyol present in the isocyanate-reactive component.

In certain embodiments, the isocyanate-reactive component further comprises a graft polyol, which denotes dispersed polymer solids chemically grafted to a carrier polyol. The graft polyol of the isocyanate-reactive component comprises a carrier polyol and particles of co-polymerized styrene and acrylonitrile, wherein the particles of co-polymerized styrene and acrylonitrile are dispersed in the carrier polyol, as set forth in more detail below. Typically, the carrier polyol of the graft polyol is a polyether polyol. The graft polyol typically has a functionality of from about 2 to about 4, more typically from about 2.5 to about 3.5.

Typically, the carrier polyol of the graft polyol is a polyether polyol. The carrier polyol may be any known polyether polyol in the art and preferably serves as a continuous phase for the dispersed co-polymerized styrene and acrylonitrile particles. That is, the co-polymerized styrene and acrylonitrile particles are dispersed in the carrier polyol to form a dispersion, i.e., to form the graft polyol. In certain embodiments, the carrier polyol is a polyether triol having a molecular weight of from about 700 to about 20,000, more typically from about 1,000 to about 5,000, and more typically from about 2,000 to about 4,000. The carrier polyol typically has the molecular weight so as to provide the flexible polyurethane foam with flexibility and a desired density, as described in greater detail below. The molecular weight of the carrier polyol typically provides randomly-sized, irregular-shaped cells, e.g., cells that differ in both size and shape from neighboring cells.

The particles of co-polymerized styrene and acrylonitrile are dispersed in the carrier polyol in an amount of from about 30 to about 60, typically from about 40 to about 55, more typically from about 42 to about 50, and even more typically about 44 parts by weight of particles based on 100 parts by weight of the carrier polyol. An example of a carrier polyol having the particles of co-polymerized styrene and acrylonitrile dispersed therein in an amount of 44 parts by weight based on 100 parts by weight of the carrier polyol is Pluracol® 4600, commercially available from BASF Corporation of Florham Park, N.J.

Without intending to be limited by theory, the graft polyol is typically present in the isocyanate-reactive component to provide the flexible polyurethane foam with an optimal cross-sectional density and to adjust the solids level of the flexible polyurethane foam. The graft polyol also typically contributes to the processability and hardness of the flexible polyurethane foam. The graft polyol also allows for optimal cell opening during production of the flexible polyurethane foam without having any adverse effects on the resilience of the flexible polyurethane foam. Further, it is believed that the graft polyol affects the flame retardance of the flexible polyurethane foam of the present invention. However, it is to be appreciated that the graft polyol is not required in the present invention for the flexible polyurethane foam to exhibit flame retardance under flammability tests according to California Technical Bulletin 117 regulations. When present, the graft polyol is typically present in the isocyanate-reactive component in an amount of from greater than 0 to 100, more typically from about 5 to about 50, even more typically from about 10 to about 30 parts by weight based on 100 parts by weight of total polyol present in the isocyanate-reactive component. When the graft polyol is present in the isocyanate-reactive component in an amount of 100 parts by weight, the isocyanate-reactive component still comprises polyether polyol as the carrier polyol in the graft polyol. The carrier polyol of the graft polyol may comprise the polyether triol illustrated and described above. Additionally, the graft polyol typically has hydroxyl number of from about 10 to about 60, more typically from about 20 to about 40 mg KOH/g. Further, the graft polyol typically has a viscosity of from about 1,000 to about 7,000 centipoise at 25° C., which allows for processing efficiencies such as ease of component mixing, thereby contributing to the cost effectiveness of producing the flexible polyurethane foam.

The isocyanate-reactive component typically further comprises a cross-linking agent having a nominal functionality of less than 4. When utilized in the isocyanate-reactive component, the cross-linking agent generally allows phase separation between copolymer segments of the flexible polyurethane foam. That is, the flexible polyurethane foam typically comprises both rigid urea copolymer segments and soft polyol copolymer segments. The cross-linking agent typically chemically and physically links the rigid urea copolymer segments to the soft polyol copolymer segments. Therefore, the cross-linking agent is typically present in the isocyanate-reactive component to modify the hardness, increase stability, and reduce shrinkage of the flexible polyurethane foam. When utilized, the cross-linking agent is typically present in the isocyanate-reactive component in an amount of from greater than zero to about 2, more typically from about 0.1 to about 1 parts by weight based on 100 parts by weight of total polyol present in the isocyanate-reactive component.

Suitable cross-linking agents include any cross-linking agent known in the art, such as diethanolamine. When utilized, diethanolamine is typically present in the cross-linking agent in an amount of about 85 parts by weight based on 100 parts by weight of the cross-linking agent. A specific example of a cross-linking agent suitable for the purposes of the present invention is Dabco™ DEOA-LF commercially available from Air Products and Chemicals, Inc. of Allentown, Pa.

The isocyanate-reactive component typically further comprises a catalyst component. The catalyst component is typically present in the isocyanate-reactive component to catalyze the flexible polyurethane foaming reaction between the isocyanate component and the isocyanate-reactive component. It is to be appreciated that the catalyst component is typically not consumed to form the reaction product of the isocyanate component and the isocyanate-reactive component. That is, the catalyst component typically participates in, but is not consumed by, the flexible polyurethane foaming reaction. When utilized, the catalyst component is typically present in the isocyanate-reactive component in an amount of from greater than 0 to about 2, more typically from about 0.10 to about 1 parts by weight based on 100 parts by weight of total polyol present in the isocyanate-reactive component. The catalyst component may include any suitable catalyst or mixtures of catalysts known in the art. Examples of suitable catalysts include, but are not limited to, gelation catalysts, e.g. crystalline catalysts in dipropylene glycol; blowing catalysts, e.g. bis(dimethylaminoethyl)ether in dipropylene glycol; and tin catalysts, e.g. tin octoate. A suitable catalyst component for purposes of the present invention is Dabco™ 33LV, commercially available from Air Products and Chemicals of Allentown, Pa. Dabco™ 33LV is a solution of 33% triethylenediamine and 67% dipropylene glycol and is typically utilized as a gelation catalyst.

In certain embodiments, the isocyanate-reactive component further comprises a cell opening additive. Typically, the cell opening additive is a di-substituted aliphatic ester having the following formula:

$$R^1-OCO-R^2-COO-R^1$$

wherein $R^1$ is an independently selected alkyl group having from 1 to 4 carbon atoms and $R^2$ is a bivalent alkyl group having from 2 to 6 carbon atoms. Specific examples of cell opening additives include, but are not limited to, dimethyl adipate, dimethyl glutarate, dimethyl succinate, dibasic ester, and combinations thereof. Dimethyl adipate is commercially available from Dow Chemical Company of Midland, Mich.

The isocyanate-reactive component may further comprise an additive component. The additive component is typically selected from the group of surfactants, blocking agents, dyes, pigments, diluents, solvents, specialized functional additives such as antioxidants, ultraviolet stabilizers, biocides, adhesion promoters, antistatic agents, mold release agents, fragrances, and combinations of the group. When utilized, the additive component is typically present in the isocyanate-reactive component in an amount of from greater than 0 to about 15, more typically from about 1 to about 10 parts by weight based on 100 parts of total polyol present in the isocyanate-reactive component.

A surfactant is typically present in the additive component of the isocyanate-reactive component to control cell structure of the flexible polyurethane foam and to improve miscibility of components and flexible polyurethane foam stability. Suitable surfactants include any surfactant known in the art, such as silicones and nonylphenol ethoxylates. Typically, the surfactant is a silicone. More specifically, the silicone is typically a polydimethylsiloxane-polyoxyalkylene block copolymer. The surfactant may be selected according to the reactivity of the polyether polyol and/or the graft polyol, if present in the isocyanate-reactive component. When utilized, the surfactant is typically present in the isocyanate-reactive component in an amount of from about 0.5 to about 2 parts by weight based on 100 parts by weight of total polyol present in the isocyanate-reactive component. A specific example of a surfactant for the purposes of the present invention is Niax® silicone L-650, commercially available from Momentive Performance Materials of Friendly, West Va.

The additive component of the isocyanate-reactive component may also include a blocking agent. The blocking agent is typically present in the additive component of the isocyanate-reactive component to delay cream time and increase cure time of the flexible polyurethane foam. Suitable blocking agents include any blocking agent known in the art. Typically, the blocking agent is a polymeric acid, i.e., a polymer with repeating units and multiple acid-functional groups. One skilled in the art typically selects the blocking agent according to the reactivity of the isocyanate component.

The isocyanate component and the isocyanate-reactive component are reacted in the presence of a blowing agent to produce the flexible polyurethane foam. As is known in the art, during the flexible polyurethane foaming reaction between the isocyanate component and the isocyanate-reactive component, the blowing agent promotes the release of a blowing gas which forms cell voids in the flexible polyurethane foam. The blowing agent may be a physical blowing agent, a chemical blowing agent, or a combination of a physical blowing agent and chemical blowing agent.

The terminology physical blowing agent refers to blowing agents that do not chemically react with the isocyanate component and/or the isocyanate-reactive component to provide the blowing gas. The physical blowing agent can be a gas or liquid. The liquid physical blowing agent typically evaporates into a gas when heated, and typically returns to a liquid when cooled. The physical blowing agent typically reduces the thermal conductivity of the flexible polyurethane foam. Suitable physical blowing agents for the purposes of the subject invention may include liquid $CO_2$, acetone, methyl formate, and combinations thereof. The most typical physical blowing agents typically have a zero ozone depletion potential.

The terminology chemical blowing agent refers to blowing agents which chemically react with the isocyanate component or with other components to release a gas for foaming. Examples of chemical blowing agents that are suitable for the purposes of the subject invention include formic acid, water, and combinations thereof.

The blowing agent is typically present in the isocyanate-reactive component in an amount of from about 0.5 to about 20 parts by weight based on 100 parts by weight of total polyol present in the isocyanate-reactive component. In certain embodiments, a combination of chemical and physical blowing agents is utilized, such as water and liquid $CO_2$.

Like the isocyanate component, the isocyanate-reactive component is substantially free of supplemental flame retardant additives. As such, the flexible polyurethane foam of the present invention is substantially free of supplemental flame retardant additives. "Substantially free" as used herein in relation to the flexible polyurethane foam being substantially free of supplemental flame retardant additives means that the flexible polyurethane foam typically comprises supplemental flame retardant additives in an amount less than about 1.0, more typically less than about 0.5, even more typically 0 parts by weight based on 100 parts by weight of all components used to produce the flexible polyurethane foam. Supplemental flame retardant additives are flame retardant additives which are separately, i.e., discretely, added to the isocyanate component or isocyanate-reactive component to impart conventional polyurethane foams produced therefrom with flame retardant properties. As set forth above, examples of supplemental flame retardant additives include, but are not limited to, minerals, such as aluminum trihydrate; salts, such as hydroxymethyl phosphonium salts; phosphorus-containing compounds; halogenated flame retardant additives, such as halocarbons; and melamine, which is also utilized as a flame retardant additive in particular applications. Unexpectedly, even without inclusion of supplemental flame retardant additives, the flexible polyurethane foam exhibits flame retardance under flammability tests according to California Technical Bulletin 117 regulations. It is believed that the inclusion of the pMDI and the monomeric MDI in the quantities set forth above, rather than TDI which is conventionally used to impart flame retardance to flexible polyurethane foams, in combination with the polyether polyol of the isocyanate-reactive component, unexpectedly provides the flexible polyurethane foam with excellent flame retardance. In particular, as set forth above, without intending to be limited by theory, it is believed that the isocyanate component, comprising pMDI and the monomeric MDI component, contributes to the excellent flame retardance of the flexible polyurethane foam because the monomeric MDI component and pMDI change the melt characteristics of the flexible polyurethane foam. More specifically, it is believed that the isocyanate component provides the flexible polyurethane foams of the present invention with a continuous crystalline matrix that provides a charred barrier to flame propagation. Additionally, it is believed that the isocyanate component minimizes vapor formation when the flexible polyurethane foam of the present invention is exposed to heat. Since flame propagation requires a vapor phase, the flexible polyurethane foam of the present invention exhibits excellent flame retardance under flammability tests according to California Technical Bulletin 117 regulations. In addition, the flexible polyurethane foam typically has a density of from about 1.0 to about 4.0, more typically from about 1.5 to about 2.5 pounds per cubic foot.

As set forth above, the present invention also provides a method of producing the flexible polyurethane foam. The method of producing the flexible polyurethane foam comprises the steps of providing the isocyanate component, providing the isocyanate-reactive component, and reacting the isocyanate component with the isocyanate-reactive component to produce the flexible polyurethane foam. The method may further comprise the steps of providing the catalyst component and reacting the isocyanate component with the isocyanate-reactive component in the presence of the catalyst component to produce the flexible polyurethane foam.

The isocyanate component and the isocyanate-reactive component are typically reacted at an isocyanate index of greater than or equal to about 90, more typically greater than or equal to about 100, even more typically about 110. The terminology isocyanate index is defined as the ratio of NCO groups in the isocyanate component to hydroxyl groups in the isocyanate-reactive component multiplied by 100. The flexible polyurethane foam of the present invention may be produced by mixing the isocyanate component and the isocyanate-reactive component to form a mixture at room temperature or at slightly elevated temperatures, e.g. 15 to 30° C. It certain embodiments in which the flexible polyurethane foam is produced in a mold, it is to be appreciated that the isocyanate component and the isocyanate-reactive component may be mixed to form the mixture prior to disposing the mixture in the mold. For example, the mixture may be poured into an open mold or the mixture may be injected into a closed mold. Alternatively, the isocyanate component and the isocyanate-reactive component may be mixed to form the mixture within the mold. In these embodiments, upon completion of the flexible polyurethane foaming reaction, the flexible polyurethane foam takes the shape of the mold. The flexible polyurethane foam may be produced in, for example, low pressure molding machines, low pressure slabstock conveyor systems, high pressure molding machines, including multi-component machines, high pressure slabstock conveyor systems, and/or by hand mixing.

In certain embodiments, the flexible polyurethane foam is produced or disposed in a slabstock conveyor system, which typically forms flexible polyurethane foam having an elongated rectangular or circular shape. It is particularly advantageous to produce the flexible polyurethane foam in slabstock conveyor systems due to the excellent processability of the flexible polyurethane foam. As known in the art, slabstock conveyor systems typically include mechanical mixing head for mixing individual components, e.g. the isocyanate component and the isocyanate-reactive component, a trough for containing a flexible polyurethane foaming reaction, a moving conveyor for flexible polyurethane foam rise and cure, and a fall plate unit for leading expanding flexible polyurethane foam onto the moving conveyor.

As set forth above, the flexible polyurethane foam of the present invention has a density of from about 1.0 to about 4.0, more typically about 1.5 to about 2.5 pounds per cubic foot. Unexpectedly, despite having such a density and being substantially free of supplemental flame retardant additives, the flexible polyurethane foam exhibits flame retardance under flammability tests according to California Technical Bulletin 117 regulations. That is, the flexible polyurethane foam of the present invention typically exhibits excellent flame retardance and satisfies requirements of the Vertical Open Flame test as specified in Section A of California Technical Bulletin 117. In addition, the flexible polyurethane foam of the present invention typically satisfies requirements of the Smoldering Screening Test as specified in Section D of California Technical Bulletin 117.

More specifically, the Vertical Open Flame test of California Technical Bulletin 117 measures an amount of time that the flexible polyurethane foam exhibits a flame after an open flame is removed, i.e., an afterflame time. The results of the Vertical Open Flame test are recorded as a char length, i.e., a distance from a flame-exposed end of the flexible polyurethane foam to an upper edge of a resulting void area, along with the afterflame time.

Unexpectedly, the flexible polyurethane foam of the present invention typically exhibits an afterflame time of less than about five, typically less than about three, more typically less than about one, even more typically zero, seconds. That is, the flexible polyurethane foam does not continue to flame for longer than five seconds after the open flame is removed, thereby minimizing risks from burn injuries when the flexible polyurethane foam is used in furniture comfort and support articles. Further, the flexible polyurethane foam unexpectedly has a char length, i.e., the distance from an end of the flexible polyurethane foam which is exposed to the flame to an upper edge of a void area of the flexible polyurethane foam, of less than four inches, typically less than three inches, even more typically less than two inches. That is, the distance from the end of the flexible polyurethane foam that is exposed to flame to an upper edge of a resulting void area is less than four inches. Thus, the flexible polyurethane foam minimizes risks from burn injuries caused by furniture articles exposed to open flames, such as candles, matches, or cigarette lighters.

Moreover, the flexible polyurethane foam of the present invention not only exhibits flame retardance, but also exhibits excellent comfort and support properties, e.g. flexibility and stability.

The following examples are intended to illustrate the invention and are not to be viewed in any way as limiting to the scope of the invention.

EXAMPLES

A flexible polyurethane foam comprises the reaction product of an isocyanate component and an isocyanate-reactive component. The isocyanate component and the isocyanate-reactive component are separately formed. Each respective composition for the isocyanate component and the isocyanate-reactive component is exemplified below.

Isocyanate-Reactive Components 1-5:

The amount and type of each component used to form each isocyanate-reactive component is indicated in Table 1 below with all values in parts by weight based on 100 parts by weight of total polyol present in each isocyanate-reactive component, i.e., the parts by weight for each component are not normalized to 100 parts of the total weight of the isocyanate-reactive component.

TABLE 1

| Component | Isocyante-reactive Component 1 | Isocyante-reactive Component 2 | Isocyante-reactive Component 3 | Isocyante-reactive Component 4 | Isocyante-reactive Component 5 |
| --- | --- | --- | --- | --- | --- |
| Polyether Polyol | 100.00 | 100.00 | 100.00 | 100.00 | 100.00 |
| Catalyst 1 | 0.36 | 0.36 | 0.30 | 0.36 | 0.40 |
| Catalyst 2 | 0.04 | 0.04 | 0.05 | 0.04 | — |
| Catalyst 3 | 0.10 | 0.10 | 0.10 | 0.10 | 0.10 |
| Surfactant | 1.50 | 1.00 | 1.00 | 1.00 | 1.40 |
| Blowing Agent 1 | 2.40 | 2.40 | 2.60 | 2.40 | 2.42 |
| Blowing Agent 2 | 2.50 | 2.50 | 2.00 | 2.50 | 3.00 |

Polyether Polyol is a polyether triol having a plurality of terminal caps comprising propylene oxide (PO) groups, a nominal molecular weight of 3,000 and a hydroxyl number of 56.

Catalyst 1 is a solution of 33% triethylenediamine and 67% dipropylene glycol.

Catalyst 2 is a solution of 70% bis(dimethylaminoethyl) ether and 30% dipropylene glycol.

Catalyst 3 is stannous octoate.

Surfactant is an organosilicon surfactant.

Blowing Agent 1 is water.

Blowing Agent 2 is $CO_2$.

Isocyanate Components 1-5:

The amount and type of each component used to form each isocyanate component is indicated in Table 2 below with all values in parts by weight based on the total weight of the each respective isocyanate component. Each isocyanate component comprises a monomeric MDI component, which comprises 2,4'-MDI and 4,4'-MDI, and pMDI. In Table 2, the amounts of the 2,4'-MDI and the 4,4'-MDI are listed individually which, when added together, provide the amount of each monomeric MDI component for each isocyanate component.

TABLE 2

| Component | Isocyanate Component 1 | Isocyanate Component 2 | Isocyanate Component 3 | Isocyanate Component 4 | Isocyanate Component 5 |
|---|---|---|---|---|---|
| 2,4'-MDI | 42.80 | 42.80 | 39.40 | 37.80 | 42.80 |
| 4,4'-MDI | 46.50 | 46.50 | 46.00 | 51.00 | 46.50 |
| pMDI | 10.70 | 10.70 | 14.60 | 10.70 | 10.70 |
| Uretonimine | — | — | — | 0.40 | — |

Flexible polyurethane foams are produced from the isocyanate-reactive components and isocyanate components set forth above. In particular, flexible polyurethane foam 1 is produced from reacting isocyanate-reactive component 1 and isocyanate component 1. Flexible polyurethane foam 2 is produced from reacting isocyanate-reactive component 2 and isocyanate component 2. Flexible polyurethane foam 3 is produced from reacting isocyanate-reactive component 3 and isocyanate component 3. Flexible polyurethane foam 4 is produced from reacting isocyanate-reactive component 4 and isocyanate component 4. Flexible polyurethane foam 5 is produced from reacting isocyanate-reactive component 5 and isocyanate component 5.

In particular, each of the formulations is processed in a Cannon-Viking Maxfoam machine. The Cannon-Viking Maxfoam machine has a mechanical mixing head for mixing individual components, a trough for containing a flexible polyurethane foaming reaction, a conveyor for flexible polyurethane foam rise and cure, and a fall plate unit for leading expanding flexible polyurethane foam onto the moving conveyor.

Specifically, to form flexible polyurethane foams 1-5, a first stream of each of the isocyanate components 1-5 is conveyed at a temperature of about 73° F. and a pressure of 805 psi to the mechanical mixing head. A second stream of each of the isocyanate-reactive components 1-5 is also conveyed at a temperature of about 80° F. to the mechanical mixing head. The mechanical mixing head mixes the first stream and the second stream at a speed of 4,000 rpm to form reaction mixtures. The reaction mixtures are fed into the trough where the polyisocyanate composition and the isocyanate-reactive composition continue to react. The expanding flexible polyurethane foams pass from the top of the trough onto the fall plate unit. The fall plate unit leads the expanding flexible polyurethane foams onto and along the conveyor for completion of the flexible polyurethane foam rise and cure.

The resulting flexible polyurethane foams 1-5 are cured for 24-48 hours. Each of the flexible polyurethane foams 1-5 is then cut into 4" thick samples for use in various tests to determine the values of various comfort and support properties, i.e., physical properties, and flammability properties.

The samples are tested to determine a density at 68° C. and 50% relative humidity in accordance with ASTM D3574, and a 25% indentation force deflection (IFD). The 25% IFD is defined as an amount of force in pounds required to indent a 50 in$^2$, round indenter foot into the sample a distance of 25% of the sample's thickness. Similarly, a 65% IFD is defined as the amount of force in pounds required to indent the indenter foot into the sample a distance of 65% of the sample's thickness.

The samples are tested for tensile strength, elongation, and tear strength in accordance with ASTM D3574. Tensile strength, tear strength, and elongation properties describe the ability of the flexible polyurethane foam to withstand handling during manufacturing or assembly operations. Specifically, tensile strength is the force in lbs/in$^2$ required to stretch the flexible polyurethane foam to a breaking point. Tear strength is the measure of the force required to continue a tear in the flexible polyurethane foam after a split or break has been started, and is expressed in lbs/in (ppi). Tear strength values above 1.0 ppi are especially desirable for applications requiring the flexible polyurethane foam to be stapled, sewn, or tacked to a solid substrate, such as furniture or bedding which are comfort and support articles. Finally, elongation is a measure of the percent that the flexible polyurethane foam will stretch from an original length before breaking.

The resilience of the flexible polyurethane foams 1-5 is measured in accordance with ASTM D3574 by dropping a steel ball from a reference height onto the samples and measuring a peak height of ball rebound. The peak height of ball rebound, expressed as a percentage of the reference height, is the resilience of the flexible polyurethane foam.

The flexible polyurethane foams are also evaluated for compression set and compression force deflection (CFD), each in accordance with ASTM D3574. Static fatigue is a measure of a loss in load-bearing performance of the flexible polyurethane foam. Compression set is a measure of permanent partial loss of original height of the flexible polyurethane foam after compression due to a bending or collapse of cellular structures within the flexible polyurethane foam. Compression set is measured by compressing the flexible polyurethane foam by 90%, i.e., to 10% of original thickness, and holding the flexible polyurethane foam under such compression at 70° C. for 22 hours. Compression set is expressed as a percentage of original compression. Finally, CFD is a measure of load-bearing performance of the flexible polyurethane foam and is measured by compressing the flexible polyurethane foam with a flat compression foot that is larger than the sample. CFD is the amount of force exerted by the flat compression foot and is typically expressed at 25%, 40%, 50%, and/or 65% compression of the flexible polyurethane foam.

Additionally, the flexible polyurethane foams also subject to humid aging for compression set and CFD, and heat aging for tensile strength and elongation according to ASTM D3547. Humid aging is an accelerated aging test method under conditions of 220° F. for 3 hours at 100% relative humidity. Heat aging is an accelerated aging test method under conditions of 220° F. for 3 hours.

Further, the samples are measured for porosity according to the air flow test of ASTM D2574. The air flow test measures the ease with which air passes through the flexible polyurethane foams. The air flow test consists of placing a sample in a cavity over a chamber and creating a specified constant air-pressure differential. The air-flow value is the rate of air flow, in cubic feet per minute, required to maintain the constant air-pressure differential. Said differently, the air flow value is the volume of air per second at standard temperature and pressure required to maintain a constant air-pressure differential of 125 Pa across a 2"×2"×1" sample.

The samples are also measured for pounding fatigue resistance in accordance with ASTM D3574-03. Dynamic pounding fatigue measures wear characteristics after 80,000 cycles.

Importantly, the samples are also evaluated for flammability. Each sample is tested to determine compliance with the California Technical Bulletin 117 Section A requirements, i.e., the Vertical Open Flame test. Specifically, the Vertical Open Flame test measures an amount of time that the samples exhibit a flame after an open flame is removed, i.e., an afterflame time. For the Vertical Open Flame test, the samples are suspended vertically 0.75 inches above a burner and a flame is applied vertically at the middle of a lower edge of the samples for 12 seconds. The results of the Vertical Open Flame test are recorded as a char length, i.e., a distance from the flame-exposed end of the sample to an upper edge of a resulting void area. The vertical open flame test is performed on original and heat aged conditioned foam samples.

The Cigarette Resistance and Smoldering Screening tests measure a resistance of the flexible polyurethane foam to burning and smoldering as well as cigarette ignition. For both the Cigarette Resistance and Smoldering Screening tests, each sample is conditioned for at least 24 hours at 70+/−5° F. and less than 55% relative humidity prior to testing.

For the Smoldering Screening test, foam samples are tested both before and after experiencing flex fatigue. To establish reference values before the samples experience flex fatigue, each sample of the flexible polyurethane foam is weighed and a pre-test weight is recorded. The sample is arranged in an L-shaped configuration, i.e., a horizontal portion of the sample is disposed adjacent to and in contact with a vertical portion of the sample. A lit cigarette is placed adjacent to and in contact with both the horizontal portion and vertical portion of the sample, and the sample and lit cigarette are covered with cotton or cotton/polyester bed sheeting material. The lit cigarette is allowed to smolder until all evidence of combustion has ceased for at least 5 minutes. After combustion has ceased, the non-burned portions of the samples are weighed and compared to the pre-test weights to determine the percent of non-smoldered flexible polyurethane foam. The results are recorded as % weight retained before pounding fatigue.

A summary of these physical properties for flexible polyurethane foams 1-5 is set forth in Table 3.

TABLE 3

| Property: | Flexible Polyurethane 1 | Flexible Polyurethane 2 | Flexible Polyurethane 3 | Flexible Polyurethane 4 | Flexible Polyurethane 5 |
|---|---|---|---|---|---|
| Air Flow (cfm) | 1.72 | 1.52 | 1.20 | 1.38 | 0.71 |
| 25% IFD (Original) (lbf) | 26 | 26 | 32 | 18 | 24 |
| 25% IFD (Return) | 19 | 20 | 23 | 14 | 18 |
| 65% IFD (Original) (lbf) | 54 | 57 | 67 | 47 | 53 |
| SAG Factor | 2.1 | 2.2 | 2.1 | 2.6 | 2.2 |
| 50% CFD (Original) (psi) | 0.41 | 0.44 | 0.50 | 0.39 | 0.45 |
| 50% CFD (Humid Aged) (%) | 96 | 97 | 96 | 91 | 88 |
| Recovery (%) | 74 | 75 | 71 | 77 | 75 |
| Block Tear (ppi) | 1.4 | 1.3 | 1.4 | 0.9 | 1.2 |
| Tensile Strength (psi) | 12.3 | 12.4 | 13.5 | 11.9 | 12.3 |
| Heat Aged Tensile Strength (%) | 113 | 110 | 102 | 104 | 114 |
| Elongation (%) | 106 | 96 | 94 | 95 | 84 |
| Density (lbs/ft3) | 1.8 | 1.9 | 1.8 | 1.9 | 1.7 |
| Resilience (%) | 43 | 46 | 40 | 46 | 39 |
| Compression Set 50% (Original) (%) | 6 | 6 | 6 | 8 | 5 |
| Compression Set 50% (Humid Aged) (%) | 7 | 8 | 7 | 11 | 9 |
| Compression Set 90% (Original) (%) | 9 | 9 | 10 | 17 | 7 |
| Compression Set 90% (Humid Aged) (%) | 15 | 12 | 14 | 16 | 18 |
| Pounding Fatigue Thickness Loss (%) | 3.8 | 4.0 | 2.8 | 3.9 | 3.0 |
| Pounding Fatigue 40% IFD Loss (%) | 29 | 29 | 28 | 25 | 24 |
| Smolder Weight Retain (%) | 99.8 | 99.7 | 99.5 | 99.5 | 99.8 |
| After Flame Time (s) | 2.0 | 0.0 | 0.5 | 0.0 | 0.0 |
| Char Length (in) | 2.1 | 1.7 | 1.9 | 4.3 | 2.8 |

Notably, each of the flexible polyurethane foams 1-5 exhibits flame retardance under flammability tests according to California Technical Bulletin 117 regulations even without inclusion of flame retardant additives. Moreover, since each of the flexible polyurethane foams 1-5 is free from flame retardant additives, the flexible polyurethane foams are cost effective to manufacture.

COMPARATIVE EXAMPLES

Comparative Isocyanate-reactive Components 1-4

The amount and type of each component used to form each comparative isocyanate-reactive component is indicated in Table 4 below with all values in parts by weight based on 100 parts by weight of total polyol present in each comparative isocyanate-reactive component, i.e., the parts by weight for each component are not normalized to 100 parts of the total weight of the comparative isocyanate-reactive component.

TABLE 4

| Component | Comparative Isocyante-reactive Component 1 | Comparative Isocyante-reactive Component 2 | Comparative Isocyante-reactive Component 3 | Comparative Isocyante-reactive Component 4 |
|---|---|---|---|---|
| Polyether Polyol | 100.00 | 100.00 | 100.00 | 100.00 |
| Catalyst 1 | 0.36 | 0.36 | 0.44 | 0.18 |
| Catalyst 2 | — | — | 0.03 | 0.06 |
| Catalyst 3 | 0.30 | 0.30 | 0.30 | 0.20 |
| Surfactant | 1.60 | 1.60 | 1.60 | 1.50 |
| Blowing Agent 1 | 2.82 | 2.82 | 2.55 | 2.40 |
| Blowing Agent 2 | 2.80 | 2.80 | 3.00 | 3.00 |

Comparative Isocyanate Components 1-4

The amount and type of each component used to form each comparative isocyanate component is indicated in Table 5 below with all values in parts by weight based on the total weight of the each comparative isocyanate component. Each comparative isocyanate component comprises a monomeric MDI component, which comprises 2,4'-MDI and 4,4'-MDI, and pMDI. In Tables 10-12, the amounts of the 2,4'-MDI and the 4,4'-MDI are listed individually which, when added together, provide the amount of each monomeric MDI component for each comparative isocyanate component (with the exception of isocyanate component 4, which comprises TDI).

TABLE 5

| Component | Comparative Isocyanate Component 1 | Comparative Isocyanate Component 2 | Comparative Isocyanate Component 3 | Comparative Isocyanate Component 4 |
|---|---|---|---|---|
| TDI | — | — | — | 100 |
| 2,4'-MDI | 30.50 | 30.50 | 23.90 | — |
| 4,4'-MDI | 52.80 | 52.80 | 60.40 | — |
| pMDI | 16.10 | 16.10 | 14.30 | — |
| Uretonimine | 0.70 | 0.70 | 1.40 | — |

4 comparative flexible polyurethane foams are produced from the comparative isocyanate-reactive components and comparative isocyanate components set forth above. Like flexible polyurethane foams 1-5, comparative flexible polyurethane foam 1 is produced from comparative isocyanate-reactive component 1 and comparative isocyanate component 1 and so on.

Physical properties of comparative flexible polyurethane foams 1-4 are measured according to the same methods and procedures outlined above with respect to flexible polyurethane foams 1-5. The results are set forth below in Table 6.

TABLE 6

| Property: | Comparative Flexible Polyurethane 1 | Comparative Flexible Polyurethane 2 | Comparative Flexible Polyurethane 3 | Comparative Flexible Polyurethane 4 |
|---|---|---|---|---|
| Air Flow (cfm) | 1.10 | 0.98 | 1.61 | 2.41 |
| 25% IFD (Original) (lbf) | 34 | 39 | 28 | 19 |
| 25% IFD (Return) | 25 | 28 | 20 | 15 |
| 65% IFD (Original) (lbf) | 79 | 90 | 67 | 40 |
| SAG Factor | 2.3 | 2.3 | 2.4 | 2.1 |
| 50% CFD (Original) (psi) | 0.62 | 0.61 | 0.50 | 0.30 |
| 50% CFD (Humid Aged) (%) | 96 | 92 | 94 | 92 |
| Recovery (%) | 72 | 72 | 73 | 79 |
| Block Tear (ppi) | 1.4 | 1.2 | 1.2 | 1.4 |
| Tensile Strength (psi) | 13.0 | 12.8 | 14.1 | 8.1 |
| Heat Aged Tensile Strength (%) | 91 | 103 | 105 | 120 |
| Elongation (%) | 83 | 71 | 95 | 102 |
| Density (lbs/ft3) | 1.8 | 1.9 | 1.8 | 1.4 |
| Resilience (%) | 45 | 44 | 44 | 54 |
| Compression Set 50% (Original) (%) | 4 | 2 | 4 | 2 |
| Compression Set 50% (Humid Aged) (%) | 6 | 5 | 5 | 3 |
| Compression Set 90% (Original) (%) | 11 | 7 | 9 | 3 |
| Compression Set 90% (Humid Aged) (%) | 23 | 18 | 16 | 4 |
| Pounding Fatigue Thickness Loss (%) | 3.5 | 4.1 | 3.8 | 2.0 |
| Pounding Fatigue 40% IFD Loss (%) | 28 | 29 | 35 | 29 |
| Smolder Weight Retain (%) | 99.1 | 98.8 | 99.1 | 100.0 |
| After Flame Time (s) | 28.0 | 28.0 | 30.0 | >8 |
| Char Length (in) | 8.3 | 7.3 | 7.3 | >10 |

Notably, comparative flexible polyurethane foams 1-4 did not exhibit flame retardance under flammability tests according to California Technical Bulletin 117 regulations.

In fact, isocyanate-reactive components 1-5 each comprise the same polyether polyol, in the same relative amount, as comparative isocyanate-reactive components 1-4. However, comparative isocyanate-reactive components 1-4 are reacted with comparative isocyanate components 1-4, which differ from isocyanate components 1-5 with respect to the relative amounts of the monomeric diphenylmethane diisocyanate component and the polymeric diphenylmethane diisocyanate, and the resulting comparative polyurethane foams fail to exhibit flame retardance under flammability tests according to California Technical Bulletin 117 regulations. This is even true when the isocyanate component comprises TDI, as illustrated in comparative isocyanate 4 and the physical properties obtained from comparative flexible polyurethane foam 4.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A flexible polyurethane foam comprising the reaction product of:
    an isocyanate component which is substantially free of toluene diisocyanate and comprises;
        polymeric diphenylmethane diisocyanate in an amount of from about 1 to about 30 parts by weight based on 100 parts by weight of said isocyanate component, and
    a monomeric diphenylmethane diisocyanate component in an amount of from about 70 to about 99 parts by weight based on 100 parts by weight of said isocyanate component and comprising 2,4'-diphenylmethane diisocyanate and 4,4'-diphenylmethane diisocyanate, wherein said 2,4'-diphenylmethane diisocyanate is present in said isocyanate component in an amount of from about 30 to about 48 parts by weight and said 4,4'-diphenylmethane diisocyanate is present in said isocyanate component in an amount of from about 22 to about 69 parts by weight, each based on 100 parts by weight of said isocyanate component, and
    an isocyanate-reactive component,
    in the presence of a blowing agent;
    wherein said flexible polyurethane foam is substantially free of supplemental flame retardant additives and exhibits flame retardance under flammability tests according to California Technical Bulletin 117 regulations.

2. A flexible polyurethane foam as set forth in claim 1 wherein said isocyanate-reactive component comprises a polyether polyol.

3. A flexible polyurethane foam as set forth in claim 2 wherein said polyether polyol is further defined as a polyether triol.

4. A flexible polyurethane foam as set forth in claim 2 wherein said isocyanate-reactive component further comprises a graft polyol comprising a carrier polyol and particles of co-polymerized styrene and acrylonitrile dispersed in said carrier polyol.

5. A flexible polyurethane foam as set forth in claim 4 wherein said carrier polyol is further defined as a polyether triol having a molecular weight of from about 1,000 to about 5,000.

6. A flexible polyurethane foam as set forth in claim 4 wherein said particles of co-polymerized styrene and acrylonitrile are dispersed in said carrier polyol of said graft polyol in an amount of from about 40 to about 55 parts by weight based on 100 parts by weight of said graft polyol.

7. A flexible polyurethane foam as set forth in claim 2 wherein said isocyanate-reactive component further comprises a cross-linking agent having a nominal functionality of less than 4.

8. A flexible polyurethane foam as set forth in claim 1 wherein said polymeric diphenylmethane diisocyanate component is present in said isocyanate component in an amount of from about 5 to about 25 parts by weight based on 100 parts by weight of said isocyanate component.

9. A flexible polyurethane foam as set forth in claim 8 wherein said monomeric diphenylmethane diisocyanate component is present in said isocyanate component in an amount of from about 75 to about 95 parts by weight based on 100 parts by weight of said isocyanate component.

10. A flexible polyurethane foam as set forth in claim 1 having a density of from about 1.0 to about 4.0 pounds per cubic foot.

11. A flexible polyurethane foam as set forth in claim 1 wherein said isocyanate-reactive component further comprises a gelation catalyst.

12. A method of producing a flexible polyurethane foam, said method comprising the steps of:
providing an isocyanate component which is substantially free of toluene diisocyanate and comprises;
polymeric diphenylmethane diisocyanate in an amount of from about 1 to about 30 parts by weight based on 100 parts by weight of the isocyanate component, and
a monomeric diphenylmethane diisocyanate component in an amount of from about 70 to about 99 parts by weight based on 100 parts by weight of the isocyanate component and comprising 2,4'-diphenylmethane diisocyanate and 4,4'-diphenylmethane diisocyanate,
wherein the 2,4'-diphenylmethane diisocyanate is present in the isocyanate component in an amount of from about 30 to about 48 parts by weight and the 4,4'-diphenylmethane diisocyanate is present in the isocyanate component in an amount of from about 22 to about 69 parts by weight, each based on 100 parts by weight of the isocyanate component,
providing an isocyanate-reactive component; and
reacting the isocyanate component and the isocyanate-reactive component in the presence of a blowing agent, thereby producing the flexible polyurethane foam;
wherein the flexible polyurethane foam is substantially free of supplemental flame retardant additives and exhibits flame retardance under flammability tests according to California Technical Bulletin 117 regulations.

13. A method as set forth in claim 12 wherein the isocyanate-reactive component comprises a polyether polyol.

14. A method as set forth in claim 13 wherein the polyether polyol is further defined as a polyether triol.

15. A method as set forth in claim 13 wherein the isocyanate-reactive component further comprises a graft polyol comprising a carrier polyol and particles of co-polymerized styrene and acrylonitrile dispersed in the carrier polyol.

16. A method as set forth in claim 15 wherein the carrier polyol is further defined as a polyether triol having a molecular weight of from about 1,000 to about 5,000.

17. A method as set forth in claim 15 wherein the particles of co-polymerized styrene and acrylonitrile are dispersed in the carrier polyol of the graft polyol in an amount of from about 40 to about 55 parts by weight based on 100 parts by weight of the graft polyol.

18. A method as set forth in claim 13 wherein the isocyanate-reactive component further comprises a cross-linking agent having a nominal functionality of less than 4.

19. A method as set forth in claim 12 wherein the polymeric diphenylmethane diisocyanate component is present in the isocyanate component in an amount of from about 5 to about 25 parts by weight based on 100 parts by weight of the isocyanate component.

20. A method as set forth in claim 19 wherein the monomeric diphenylmethane diisocyanate component is present in the isocyanate component in an amount of from about 75 to about 95 parts by weight based on 100 parts by weight of the isocyanate component.

21. A method as set forth in claim 12 wherein the flexible polyurethane foam is produced along a slabstock conveyor system.

22. A method as set forth in claim 12 wherein the flexible polyurethane foam has a density of from about 1.0 to about 4.0 pounds per cubit foot.

23. A method as set forth in claim 12 wherein the isocyanate-reactive component further comprises a gelation catalyst.

* * * * *